United States Patent

Brehm et al.

Patent Number: 5,717,809
Date of Patent: Feb. 10, 1998

[54] OPTICAL FIBER COATED WITH AN AMORPHOUS BORON PROTECTIVE LAYER, AND A METHOD OF DEPOSITING SUCH A LAYER

[75] Inventors: Claude Brehm, Montrouge; Lionel Vandenbulcke, Saint Jean le Blanc; Jean-Yves Boniort, Limours; Bruno Lavigne, Antony, all of France

[73] Assignee: Alcatel Fibres Optiques, Bezons Cedex, France

[21] Appl. No.: 632,415

[22] PCT Filed: Aug. 23, 1995

[86] PCT No.: PCT/FR95/01106

§ 371 Date: Apr. 24, 1996

§ 102(e) Date: Apr. 24, 1996

[87] PCT Pub. No.: WO96/06054

PCT Pub. Date: Feb. 29, 1996

[30] Foreign Application Priority Data

Aug. 25, 1994 [FR] France ............... 94 10283

[51] Int. Cl.$^6$ ........................................ G02B 6/02
[52] U.S. Cl. ............... 385/128; 385/123; 65/60.1; 428/366
[58] Field of Search ............... 385/128, 123–127; 65/60.1, 430, 382, 381; 428/366

[56] References Cited

U.S. PATENT DOCUMENTS

| 4,319,803 | 3/1982 | Burmeister et al. | 385/128 |
| 4,735,856 | 4/1988 | Schultz et al. | 385/128 X |
| 5,000,541 | 3/1991 | DiMarcello | 385/128 |
| 5,246,746 | 9/1993 | Michalske et al. | 427/593 |
| 5,354,348 | 10/1994 | Zushi et al. | 65/430 X |

FOREIGN PATENT DOCUMENTS

| 0149323A2 | 7/1985 | European Pat. Off. |
| WO8201543 | 5/1982 | WIPO |
| WO8705831 | 10/1987 | WIPO |

*Primary Examiner*—Phan T.H. Palmer
*Attorney, Agent, or Firm*—Sughrue, Mion, Zinn, Macpeak & Seas, PLLC

[57] ABSTRACT

An optical fiber comprising an optical core enclosed in optical cladding, both made of a silica-based material, and a protective layer constituted by amorphous boron. The amorphous boron layer is deposited on a non-crystalline carbon which is itself deposited directly on the optical cladding. Also, a method is provided for depositing an amorphous boron layer on an optical fiber and includes a deposition step of depositing a layer of carbon on the fiber, followed by a subsequent step of depositing the amorphous boron protective layer chemically from the vapor phase on the layer of carbon.

11 Claims, 1 Drawing Sheet

OPTICAL FIBER COATED WITH AN AMORPHOUS BORON PROTECTIVE LAYER, AND A METHOD OF DEPOSITING SUCH A LAYER

The present invention relates to an optical fiber coated with an amorphous boron protective layer, and a method of depositing such a layer.

BACKGROUND OF THE INVENTION

The conventional structure of an optical fiber is well-known: an optical fiber comprises an optical core, for guiding the majority of the light waves, enclosed in optical cladding, the core and the cladding both being constituted by a silica-based material which is doped to a greater or lesser extent in the core and cladding zones. "Optical cladding" is defined here in a broad sense, i.e. the optical cladding comprises all the silica-based layers which surround the core, regardless of the method by which they have been obtained.

In certain known optical fibers, the optical cladding is directly covered by a resin coating, designed to avoid in part the consequences of the microbends suffered by the fiber, in particular while it is being installed in a cable. During installation and use, the optical fiber is subjected to bending and traction stresses which lead in the long term to mechanical fatigue, i.e. to deterioration of its mechanical properties which consequently results in deterioration of its transmission performance.

In other known optical fibers, designed mainly to be used in moist environments (in particular in underwater applications) where the optical fiber is subjected to the action of water and hydroxyl ions OH—, a protective layer is disposed directly on the optical cladding, under the resin coating. When the optical fiber is subjected to stresses which lead to mechanical fatigue and consequently provoke microcracks in its surface, attack by moisture or by $OH^-$ ions cause the microcracks in its surface to grow, which weakens the fiber, causing it to break.

In known manner, the protective layer provided on said fibers is generally constituted by carbon that is non-crystalline or turbostratic (i.e. having a structure that causes it to provide much better sealing than does graphite carbon) which carbon is deposited on the optical fiber chemically from the vapor phase, for example.

However, such a carbon protective layer is not entirely satisfactory: although it provides sufficient sealing for the fiber, it presents poor resistance to abrasion because it is not hard enough. It does not therefore protect the fiber in the long term against abrasion due to rubbing against other fibers when a plurality of fibers are installed in a cable, or due to rubbing against the inside wall of the cable in which it is installed. Unfortunately, abrasion causes microcracks to appear in the surface of the fiber, which leads to the risk of the fiber breaking.

To avoid abrasion of the fiber, the resin coating of the fiber must be very thick, in practice, not less than 60 μm thick. Unfortunately, this is very detrimental when, as in the current case, it is desired to increase the capacity of optical fiber cables, so that they can contain up to 50 to 100 optical fibers. Thus a very thick resin coating prevents the cable being compact, with compactness being necessary to enable cables to be used in applications where very little space is available.

U.S. Pat. No. 4,319,803 proposes providing an amorphous boron protective layer, which is supposed to enable the above-mentioned drawbacks to be eliminated.

In addition, a method is known from the article entitled "Chemical Vapor Deposition of Amorphous Boron on Massive Substrates", published in the Journal of Electrochemical Society—Solid-State Science and Technology—February 1976, of depositing amorphous boron chemically from the vapor phase by reducing gaseous boron chloride $BCl_3$ by means of hydrogen $H_2$ on substrates that are inert relative to boron chloride, i.e. they do not react with it.

A method of that type, using boron chloride or any other boron halide such as $BF_3$ (boron fluoride) or $BBr_3$ (boron bromide), is simple and cheap to implement. In particular, it avoids the use of hydrides (such as $SiH_4$, recommended in U.S. Pat. No. 4,319,803) as starting reagents, said compounds, and in particular boron hydride $B_2H_6$, are very toxic and explosive when exposed to air, and do not enable high deposition speeds to be obtained.

However, it is not possible to apply said method to depositing amorphous boron directly on silica $SiO_2$, because said silica is not inert relative to boron halides, i.e. it reacts chemically with them.

OBJECT AND SUMMARY OF THE INVENTION

The object of the present invention is therefore to propose an optical fiber provided with a boron protective layer which can be made by the cheapest and simplest method known today, whilst avoiding any interaction between the boron halide and the silica of the optical fiber.

To this end, the present invention proposes an optical fiber comprising an optical core enclosed in optical cladding, both made of a silica-based material, and a protective layer constituted by amorphous boron, wherein said boron protective layer is deposited on a non-crystalline carbon layer, itself deposited directly on said optical cladding.

Carbon is inert relative to boron halides, i.e. it does not react chemically with them. The carbon layer therefore acts as a protective barrier for avoiding any interaction between the boron halide and the silica of the optical cladding during boron deposition. Furthermore, the carbon layer causes the resulting optical fiber to be easier to strip and to be better sealed.

The method of the invention for depositing an amorphous boron layer on an optical fiber comprising an optical core enclosed in optical cladding, both made of a silica-based material, includes a deposition step of depositing a layer of carbon on said fiber, followed by a subsequent step of depositing said amorphous boron protective layer chemically from the vapor phase on said layer of carbon, by reducing a boron halide by means of hydrogen $H_2$.

The fiber of the invention enables an amorphous boron layer to be deposited on a optical fiber by the simplest and cheapest method known, whilst avoiding interactions which may occur between the boron halide used and the silica.

The temperature for boron deposition is selected, for example, to lie in the range 1050° C. to 1250° C.

The ratio R of the molar concentration of the boron halide to that of the hydrogen advantageously lies in the range 1/20 to 2/3.

According to another characteristic of the present invention, the boron coating is applied in line with fiber-drawing, and the running speed of the fiber while it is being coated in boron is not less than 100 m/min.

To deposit a boron layer which is amorphous, i.e. non-crystalline, it is necessary for the rate of renewal of the gaseous reagents in the deposition reactor to be high. In the present invention, this is advantageously obtained by the fact that the fiber runs through said reactor at high speed, i.e. at a speed of not less than 100 m/min.

The deposition rate of the amorphous boron layer may be at least 0.10 µm/s, and is preferably in the vicinity of 0.25 µm/s. By imposing such a lower limit for the boron deposition rate, by an appropriate selection of flow rates for the various reagents given the running speed of the fiber, it is guaranteed that the deposited boron does not have time to crystallize at the temperature of the deposition reaction.

Boron deposition can be performed at a pressure in the vicinity of atmospheric pressure.

Finally, according to a very advantageous characteristic of the invention, it is possible to add to the initial mix of gaseous reagents a gaseous reagent that is a precursor of silicon, such as $SiH_4$, $SiH_3Cl$, $SiH_2Cl_2$, $SiHCl_3$, or $SiCl_4$; said compounds being given above in order of decreasing reactivity. This enables the layer of boron to be doped with silicon.

In quite remarkable manner, it has been observed that the amorphous boron layer doped with silicon in this way is much harder than a layer of amorphous boron which has not been doped with silicon: the Vickers hardness of non-doped amorphous boron deposited on a substrate that is inert relative to the boron halide used, such as carbon, lies in the range 3000 $kg/mm^2$ to 4000 $kg/mm^2$, whereas that of boron doped with silicon deposited on the same substrate lies in the range 4700 $kg/mm^2$ to 7800 $kg/mm^2$ (by way of indication, the Vickers hardness of natural diamond is 9000 $kg/mm^2$).

Other elements can be employed as dopants for increasing the hardness of the boron layer, starting from their gaseous precursors. They include for example: cobalt, nickel, chromium, copper, iron, scandium, manganese, titanium, and aluminium.

BRIEF DESCRIPTION OF THE DRAWING

Other characteristics and advantages of the present invention appear in the following description of an optical fiber and a method of the invention, given by way of non-limiting example.

In the following figures.

In the figures, common elements have the same reference numbers.

MORE DETAILED DESCRIPTION

Initially it is recalled that amorphous boron is non-crystalline boron, characterized in particular by the absence of grain boundaries in its structure, giving it good sealing properties and high breaking strength. It therefore presents the same advantages as non-crystalline carbon concerning its sealing properties. However, it is much harder than non-crystalline carbon, thereby imparting improved abrasion resistance to the fiber, such that the thickness of the resin protective coating can be substantially reduced in comparison with such a protective layer made on the basis of carbon. Said resin protective coating may even be omitted.

It is recalled that non-crystalline structures are characterized by disorganization of the matter that constitutes them. A 1% content of crystallized grains corresponds to traces of crystallization which cannot be prevented from appearing, and which are therefore present by way of structural imperfections in the amorphous layer of boron, without significant consequences to the desired properties of the protective layer. With such a crystallized grain content, it can be said that the deposited boron is "essentially" non-crystalline, or amorphous.

Figure 1:
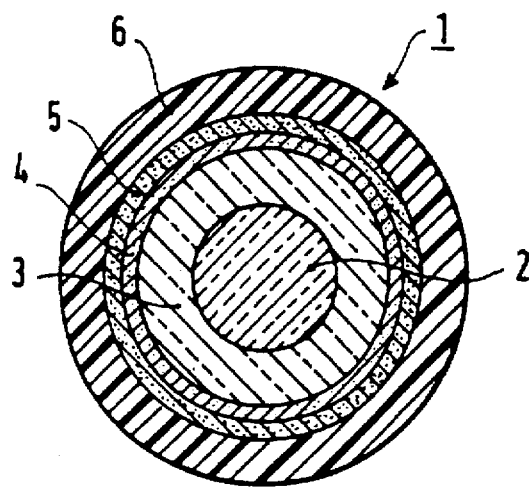
FIG. 1 is a cross-section view of an optical fiber of the invention.

FIG. 1 shows a fiber 1 of the invention including, disposed coaxially from the inside to the outside:

a silica-based optical core 2 for guiding the majority of the light waves;

optical cladding 3 which is also silica-based;

a layer 4 of non-crystalline carbon of thickness lying in the range 10 nm to 50 nm, and preferably in the vicinity of 30 nm;

a layer 5 of amorphous boron of thickness lying in the range 10 nm to 200 nm, and preferably in the vicinity of 100 nm; and an optional resin protective coating 6 of thickness less than 50 µm, and preferably in the vicinity of 10 µm.

Naturally, the core and the optical cladding can have a conventional simple structure, i.e. each having a single respective layer of constant refractive layer, or they may be of more complex structure, i.e. each constituted by a plurality of superposed layers, and each having a varying refractive index. Neither the structure of the core nor that of the optical cladding is described in greater detail since such structure is not part of the present invention. However, it will readily be understood that the invention can be applied to any known fiber structure.

The layer 5 of non-crystallized boron of the invention imparts mechanical protection to the fiber, and enhanced abrasion resistance, enabling the fiber 1 to be used in optical cables of high capacity and that are highly compact. The thickness of the resin coating can be about half that required when a carbon protective layer is used, and can even be eliminated. The layer 5 further provides sealing properties comparable to those provided by a carbon layer.

A deposition method of the invention is now described with reference to FIG. 2, which is a diagram showing a machine 10 enabling the fiber 1 of the invention to be manufactured.

The machine 10 comprises, disposed one after another within a vertical fiber-drawing installation:

a fiber-drawing oven 11 in which a fiber is drawn from preform 12 in well-known conventional manner, said preform having an optical core (not shown) identical in composition and greater in diameter than the core 2, enclosed in optical cladding (not shown) identical in composition and greater in thickness than the optical cladding 3, the ratio of the diameter of the optical cladding to the diameter of the optical core of the preform 12 being identical to the ratio of the diameter of the optical cladding 3 to the diameter of the optical core 2;

a reactor 14 for depositing the layer 4 of non-crystalline carbon on the bare optical fiber 13;

a reactor 15 for depositing the layer 5 of amorphous boron;

control means 16 for controlling the diameter of the fiber leaving the reactor 15;

resin coating means 17, for producing the resin coating 6 on the boron layer 5;

a device 18 for polymerizing the resin coating 6 by ultraviolet radiation;

control means 19 for controlling the final diameter of the resulting fiber 1; and a reel 20 for winding-in the finished fiber 1.

Only one reactor 14 has been shown for carbon deposition, and only one reactor 15 for boron deposition. However, when necessary, carbon deposition and/or boron deposition can be performed in a plurality of reactors disposed one after another along the fiber-drawing line.

Carbon deposition can be performed by any known method, for example, chemically from the vapor phase.

In order to deposit a boron layer on the carbon coated optical fiber, a boron halide, for example gaseous boron chloride, is reduced by gaseous hydrogen in application of the following equation:

$$2BCl_3 + 3H_2 \rightarrow 2B + 6HCl$$

Boron deposition is thus performed chemically from the vapor phase. The reduction is performed at a temperature of about 1150° C., the ratio of the molar concentration of the boron chloride to that of the hydrogen being in the vicinity of 1/4.

Boron and carbon deposition are preferably performed at a pressure in the vicinity of atmospheric pressure, particularly when they are performed in line with fiber-drawing, in order to enable open reactors to be used to make it possible for the fiber to enter and to leave the reactor.

To obtain an amorphous boron layer 5, it is preferable for the transfer speed of the gaseous phase boron to the surface of the carbon coated fiber to be high. It is by applying the boron to the surface of the fiber at said high speed which ensures that a layer of boron is formed that is essentially non-crystalline. Said high speed can be achieved by rapid renewal of the reagents at the surface of the fiber. The rapid renewal of the reagents at the surface of the fiber, which is accompanied by a rapid evacuation of gaseous products from the deposition reaction, i.e. hydrochloric acid HCl when the reagents are $BCl_3$ and $H_2$, is achieved both because the fiber runs at high speed through the reactor 15, and because the gaseous phase is renewed by the flows of gas between the inlet and the outlet of the reactor 15. Thus the running speed of the fiber in the reactor is preferably not less than 100 m/min, which corresponds to a conventional speed for fiber-drawing; consequently, manufacture of the optical fiber is not slowed down by the operation of depositing the amorphous boron coating in line with fiber-drawing.

With a running speed for the carbon coated fiber through the reactor 15 of 200 m/min, it is possible to deposit a boron coating 7 of thickness approximately equal to 75 nm in 0.3 s, using a boron coating growth rate of 0.25 μm/s. (Such a growth rate can be obtained by choosing a boron chloride flow rate of 0.5 l/min and a hydrogen flow rate of 5 l/min).

A reagent that is a precursor of silicon, such as $SiH_4$, $SiH_3Cl$, $SiH_2Cl_2$, $SiHCl_3$, or $SiCl_4$, can advantageously be added to the gaseous phase. In that case, the boron layer 5 is doped with silicon which increases its hardness.

Figure 2:
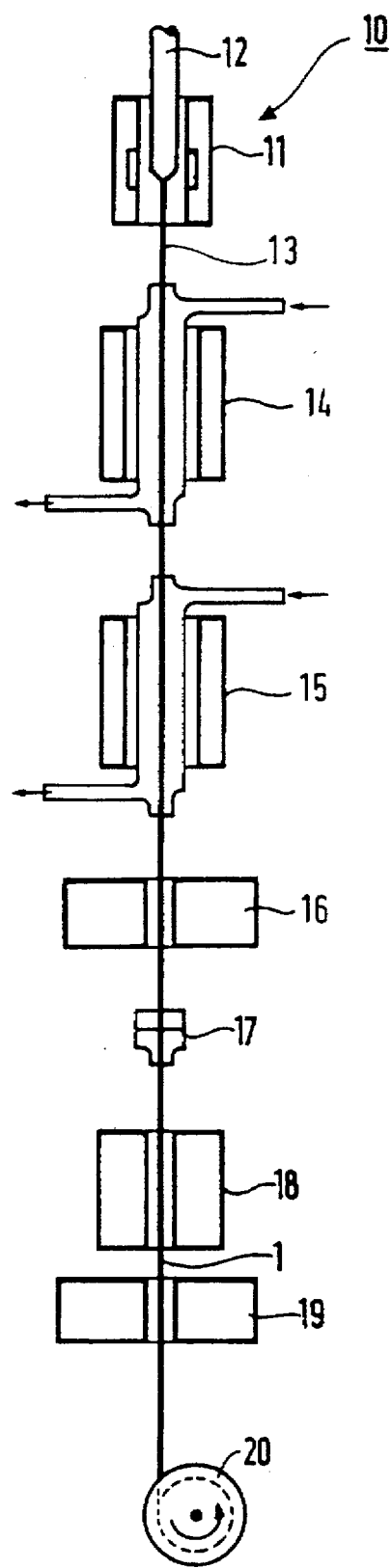
FIG. 2 is a simplified diagram of a machine for implementing the method of the invention.

The machine 10 described in relation to FIG. 2 is a conventional fiber-drawing machine, to which a deposition reactor 14 for depositing the carbon layer 4 and a reactor 15 for depositing the boron layer 5 have been added. Certain elements of the machine 10 are optional, such as the diameter control means 16 and 19. Furthermore, the resin coating means may be of any type, and the resin coating need not be performed in the line.

Naturally, the present invention is not limited to the above-described embodiment. In particular, the numerical values given for the characteristics of the boron layer and for the method of depositing said layer are by way of indication only. In addition, an optical fiber of the invention may comprise, on top of the boron layer, other layers in addition to the resin coating, such as colored identification coatings in particular.

Finally, any means can be replaced by equivalent means without going beyond the ambit of the invention.

We claim:

1. An optical fiber comprising an optical core enclosed in optical cladding, both made of a silica-based material, a non-crystalline carbon layer deposited directly on said optical cladding, and a protective layer constituted by amorphous boron, wherein said amorphous boron protective layer is deposited on said non-crystalline carbon layer.

2. A fiber according to claim 1, wherein the thickness of said boron layer lies in the range 10 nm to 200 nm, and is preferably about 100 nm.

3. A fiber according to claim 1, wherein said boron layer is doped with silicon.

4. An optical fiber according to claim 1, wherein said boron layer is covered in a resin coating, that has a thickness of less than 50 μm.

5. A method of depositing an amorphous boron layer on an optical fiber comprising an optical core enclosed in optical cladding, both made of a silica-based material, the method including a deposition step of depositing a layer of carbon on said fiber, followed by a subsequent step of depositing said amorphous boron protective layer chemically from the vapor phase on said layer of carbon, by reducing a boron halide by means of hydrogen $H_2$.

6. A method according to claim 5, wherein the boron halide is boron chloride.

7. A method according to claim 5, wherein boron deposition is performed at a temperature lying in the range 1000° C. to 1250° C.

8. A method according to claim 5, wherein the ratio of the molar concentration of the boron halide to that of the hydrogen lies in the range 1/20 to 2/3.

9. A method according to claim 5, wherein the carbon and boron are deposited in line with fiber-drawing said optical fiber, the running speed of said fiber being not less than 100 m/min during deposition.

10. A method according to claim 5, wherein said boron deposition is performed at a pressure in the vicinity of atmospheric pressure.

11. A method according to claim 5, further comprising the step of adding a gaseous precursor of silicon, chosen from $SiH_4$, $SiH_3Cl$, $SiH_2Cl_2$, $SiHCl_3$, or $SiCl_4$, to the initial mix of reagents.

* * * * *